(12) United States Patent
Ushirogi

(10) Patent No.: US 6,490,109 B1
(45) Date of Patent: Dec. 3, 2002

(54) DATA STORAGE DEVICE

(75) Inventor: Shingo Ushirogi, Kanagawa (JP)

(73) Assignee: Denon Ltd., Tokyo (JP)

(*) Notice: Subject to any disclaimer, the term of this patent is extended or adjusted under 35 U.S.C. 154(b) by 0 days.

(21) Appl. No.: 09/707,969

(22) Filed: Nov. 8, 2000

(30) Foreign Application Priority Data

Nov. 9, 1999 (JP) .......................................... 11-318696
Feb. 4, 2000 (JP) ...................................... 2000-027521

(51) Int. Cl.$^7$ .............................................. G11B 5/09
(52) U.S. Cl. ............................ 360/48; 360/29; 360/30; 360/32; 360/39; 341/106; 341/110; 341/123; 341/165; 386/112; 386/117; 386/109; 386/125; 386/126
(58) Field of Search ................................ 341/110, 123, 341/165, 106; 360/281, 30, 32, 39, 48; 386/112, 117, 109, 125, 126

(56) References Cited

U.S. PATENT DOCUMENTS

| 4,673,916 A | * | 6/1987 | Kitamura et al. ............ 340/347 |
| 4,983,967 A | * | 1/1991 | Mckenzie ................... 341/110 |
| 5,381,275 A | * | 1/1995 | Nitta et al. .................... 360/48 |
| 5,915,069 A | * | 6/1999 | Nishijima ................... 348/143 |
| 6,115,341 A | * | 9/2000 | Hirai ........................ 369/59.13 |
| 6,192,190 B1 | * | 2/2001 | Tojo et al. .................. 386/109 |

FOREIGN PATENT DOCUMENTS

JP 11-073728 3/1999

* cited by examiner

*Primary Examiner*—Michael Tokar
*Assistant Examiner*—Linh Van Nguyen
(74) *Attorney, Agent, or Firm*—Young & Thompson

(57) ABSTRACT

There is provided a data storage device concurrently allowing storage of data that can be reproduced in higher quality and storage of data that can be used also in a data transmission path with a lower transfer speed. The data storage device comprises an A/D converter 103 for sampling analog audio signals based on a sampling frequency, a DSP 104 for compressing sample data sequentially output from the A/D converter 103, a storing and reading control unit 107 for storing the compressed data sequentially output from the DSP 104, and a control unit 105 for controlling the DSP 104 and the storing and reading control unit 107 for dividing the sample data sequentially output from the A/D converter 103 into a group under odd number of turns and a group under even number of turns, compressing the groups at each different compression rate and storing them on different storage areas A and B, respectively.

8 Claims, 5 Drawing Sheets

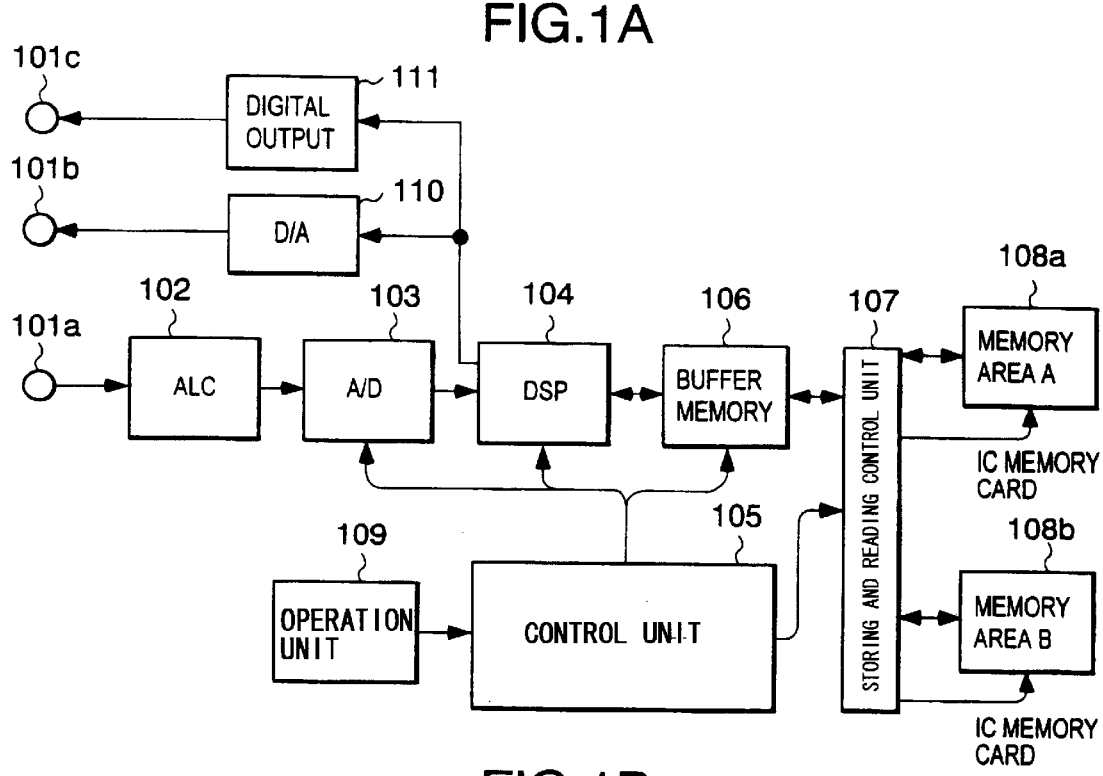
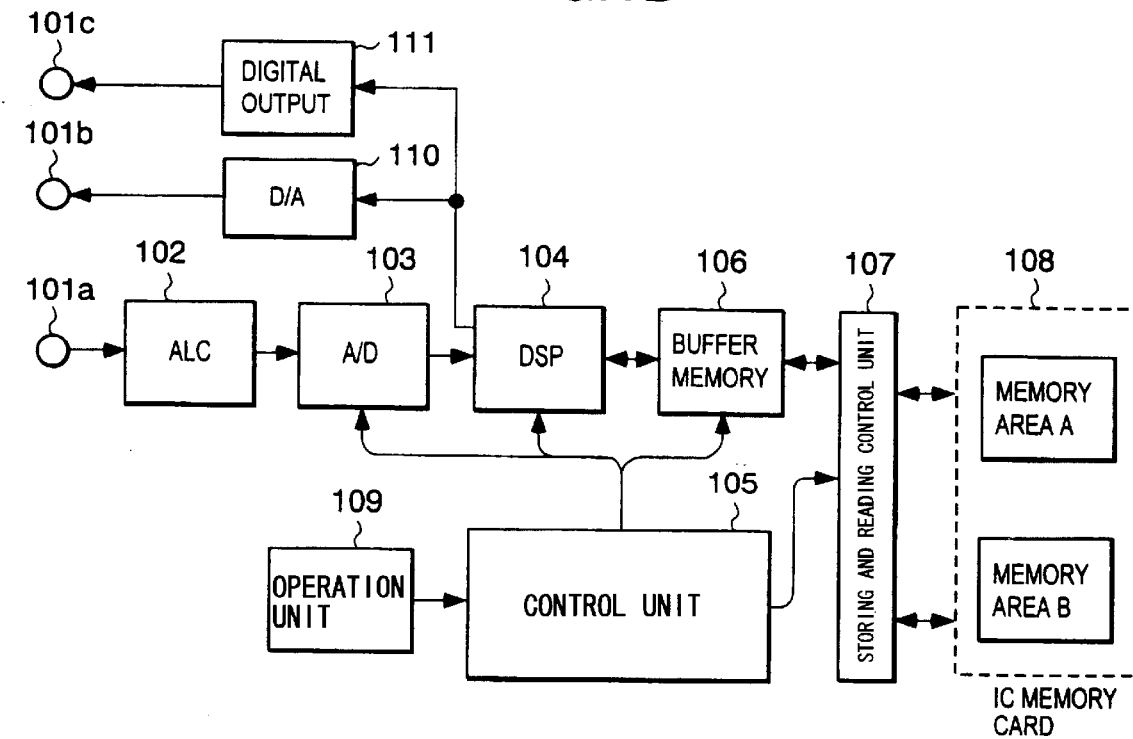

DATA STORAGE DEVICE

BACKGROUND OF THE INVENTION

This invention relates to a data storage device for storing digital data on a storage medium.

In a data storage device for converting analog signals such as audio signals and video signals to digital data and storing them on a storage medium, the data amount to be stored on the storage medium depends on the number of quantified bits and/or sampling frequencies of sample data.

Setting higher number of quantified bits or higher sampling frequency of the sample data allows high quality audio signals or video signals to be reproduced. However, in order to transmit the data in a short period of time it is necessary to use a data transmission path with a higher transfer speed. On the other hand, storing sample data by setting quantified bit numbers and sampling frequencies lower, data can be transmitted in a short period of time even by using a data transmission path with a lower transfer speed. However, it deteriorates the quality of reproducible audio signals or video signals.

SUMMARY OF THE INVENTION

In case where analog signals such as audio signals and video signals are converted to digital data and stored on a storage medium, when the analog signals to be stored can be obtained only once, they are often stored on the storage medium with higher quality.

However, when data stored on a storage medium is read out and transmitted to another device by using some communication device, the data transmission takes a long time if the communication device is an analog telephone line with a lower communication speed, for example. On the other hand, if the data transmitted through the telephone line, for example, is used as a news script in a broadcast station, for example, audio signals or video signals to be reproduced from the data only need to have quality enough for completing a task for creating a text script.

Further, when data stored on a storage medium is edited, a digital signal processor, DSP, for performing rapid computing has to be used in order to perform signal processing on a large amount of sample data by setting the quantified bit number and/or sampling frequency of sample data higher.

The present invention was made in view of those factors. It is an object of the present invention to provide a data storage device, which can store data reproducible of high quality and store data usable in a data transmission path with a lower transfer speed.

In order to overcome the above problem, according to a first aspect of the present invention there is provided a data storage device for converting analog signals to digital data and storing the digital data on a storage medium including a sampling unit for sampling the analog signals based on a sampling frequency, a compression unit for compressing the sample data output sequentially from the sampling data, a storage unit for storing compressed data output sequentially from the compression unit and a control unit for controlling the compression unit and the storage unit so as to divide sample data output sequentially from the sampling unit into a plurality of groups for every predetermined output period (interval), compress those group at different compression rates and store them in different storage areas, respectively.

According to a second aspect of the present invention there is provided a data storage device for converting analog signals to digital data and storing the digital data on a storage medium including a sampling unit for sampling the analog signals based on a sampling frequency, a storage unit for storing sample data output sequentially from the sampling unit and a control unit for controlling the storage unit so as to divide sample data output sequentially from the sampling unit into a plurality of groups for every predetermined output period (interval) and store them in different storage areas, respectively.

Here, different storage areas may be provided on a same storage medium or on different storage media.

BRIEF DESCRIPTION OF THE DRAWINGS

FIGS. 1A and 1B show configurations of an IC memory storing and reading device to which an embodiment of the present invention is applied;

DETAILED DESCRIPTION OF THE PREFERRED EMBODIMENTS

Figure 2A:
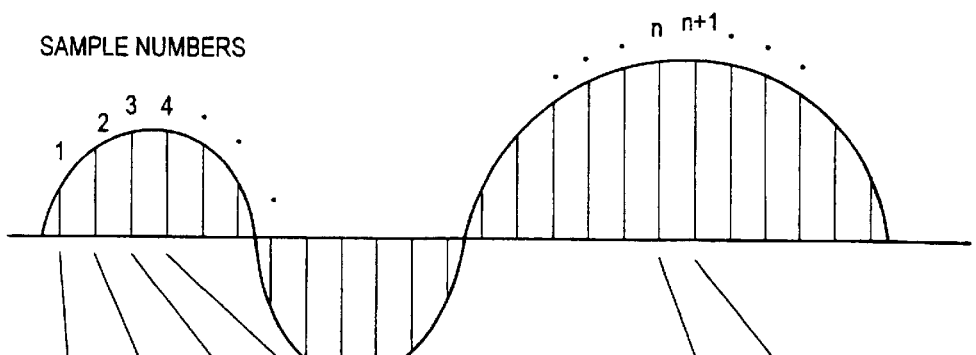
FIGS. 2A to 2E are diagrams for describing operational sequences in the case where audio signals are stored on an IC memory card as sample data in different bit rates in an IC memory storing and reading device of a first embodiment of the present invention.

Embodiments according to the present invention will be described.

First of all, a first embodiment will be described.

FIGS. 1A and 1B show configurations of an IC memory storing and reading device to which a first embodiment of the present invention is applied. Here, in FIG. 1A, two IC memory cards 108a and 108b are attached to the IC memory storing and reading device and are used in this case as a storage area A and a storage area B, respectively. In FIG. 1B, one IC memory card 108 is attached to the IC memory storing and reading device and is here divided into a storage area A and a storage area B for use.

An audio input terminal 101a is an input portion of audio signals to which a microphone terminal of a microphone for collecting audio signals is inserted during interviewing, for example. An audio output terminal 101b is a terminal for outputting reproduced audio signals. A digital output terminal 101c is an output terminal for outputting digital signals to Modulator and Demodulator, a modem, connected to an analog telephone line, not shown.

An auto level controller, ALC, 102 detects a level of audio signals input from the audio input terminal 101a and controls the level of audio signals so that the level of the audio signals to be input to an analog-to-digital converter, A/D converter, 103 does not reach to a saturation level.

The A/D converter 103 converts audio signals to digital sample data. A digital signal processor, DSP, 104 compresses (encodes) the sample data output from the A/D converter 103 at a compression rate instructed by a control unit 105. Further, it decompresses (decodes) the compressed sample data for outputting to the D/A converter 110.

The sample data compressed by the DSP 104 is stored in a buffer memory 106 temporally and stored on IC memory cards 108a and 108b by a storing and reading control unit 107.

The storing and reading control unit 107 stores the compressed sample data from the buffer memory 106 to the IC memory cards 108a and 108b and reads it out from the IC memory cards 108a and 108b to the buffer memory 106. The control unit 105 controls switchover of compression rates when the DSP 104 compresses the sample data. Further, the control unit 105 controls an operation of the storing and reading control unit 107.

An operation unit 109 has setting buttons including a button for setting a sampling frequency of audio signals, a compression rate of sample data and the like, and for setting read and store modes, and an operation button for designating an operation of the IC memory storing and reading device.

The D/A converter 110 converts the sample data output by the DSP 104 to analog audio signals. A digital output unit 111 converts the sample data output by the DSP 104 into a predetermined transmission format and outputs it to the digital output terminal 101c as one audio file.

Next, an operation by the IC memory storing and reading device according to this embodiment will be described.

FIGS. 2A to 2E are diagrams for describing operational sequences for generating two data groups at different bit rates from audio signals and storing them on different storage areas A and B in the IC memory storing and reading device according to this embodiment.

Figure 2B:
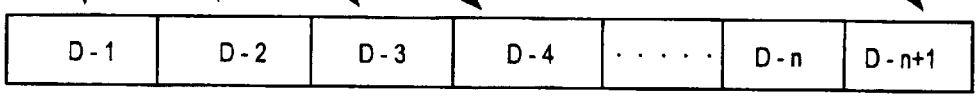

Here, FIG. 2A shows a state of sampling analog audio signals to be input to the A/D converter 103 at a sampling frequency fs (for example, 22.05, 44.1 and 96 kHz). Numerals 1, 2, 3, . . . n+1 are referred to sample numbers. Sample data under the sample number 1 is referred to D-1;

sample data under the sample number 2 is referred to D-2; sample data under the sample number 3 is referred to D-3; and sample data under the sample number n is referred to D-n. FIG. 2B shows time-series order of sample data collected by sampling at the sampling frequency fs.

Figure 2C:

Now, the control unit 105 controls switchover of compression modes used by DSP 104 for every sample data in order to compress the sample data under an odd sample number at a lower compression rate and compress the sample data under an even sample number at higher compression rate. Therefore, as shown in FIG. 2C, the sample data with the lower compression rate (D-1, D-3, D-5, . . . D-n, . . . ) and the sample data with the higher compression rate (D-2, D-4, D-6, . . . D-n+1) are output alternately from the DSP 104.

Figure 2D:
Figure 2E:
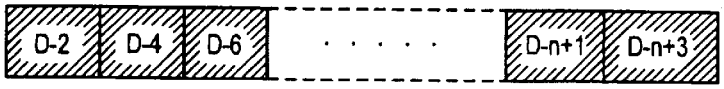

The buffer memory 106 temporally stores sample data output in time series order. The storing and reading control unit 107 divides sample data stored in the buffer memory 106 into a group of sample data compressed at the lower compression rate and a group of sample data compressed at the higher compression rate in order to store each group in the different storage areas A and B in accordance with an instruction by the control unit 105. According to this embodiment, the group of sample data with the lower compression rate (D-1, D-3, D-5, . . . D-n, . . . ) is stored in the storage area A while the group of sample data with the higher compression rate (D-2, D-4, D-6, . . . D-n+1, . . .) is stored in the storage area B. FIG. 2D shows an arrangement of sample data stored in the storage area A while FIG. 2E shows an arrangement of sample data stored in the storage area B.

Next, an operation for reading out sample data stored in a plurality of storage areas at different bit rates will be described.

FIGS. 3A to 3E are diagrams for describing operational sequences for reading out sample data stored in the storage areas A and B at different bit rates for reproducing audio signals.

Figure 3A:
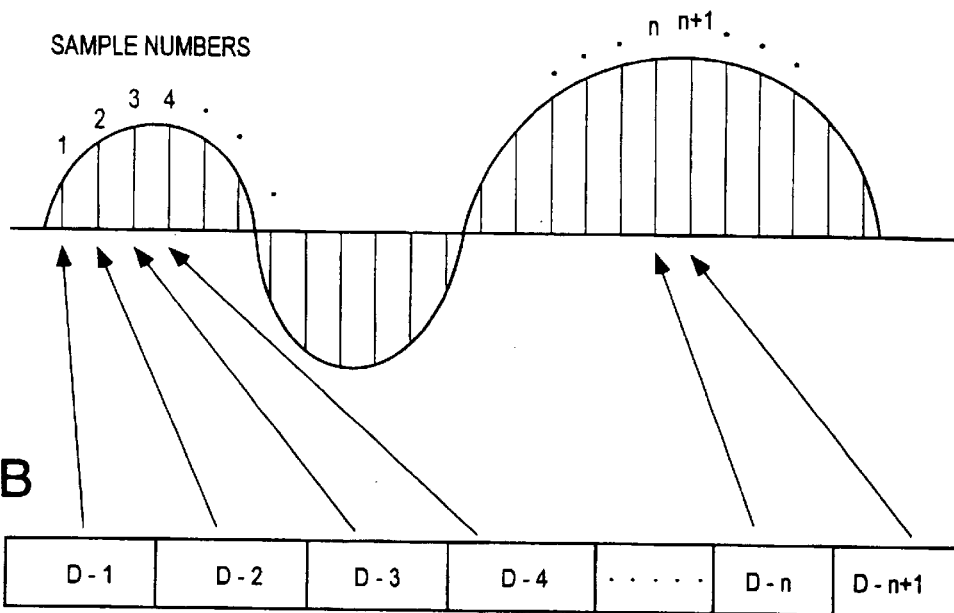
FIGS. 3A to 3E are diagrams for describing operational sequences in the case where sample data stored in different bit rates on an IC memory card are read out in order to reproduce an audio signal in an IC memory storing and reading device of the first embodiment of the present invention.
Figure 3B:
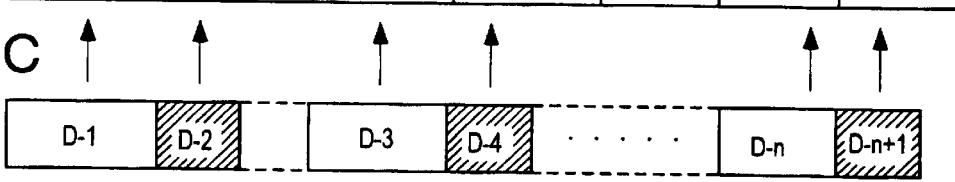
Figure 3C:
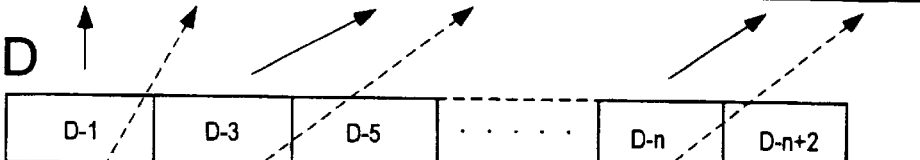
Figure 3D:
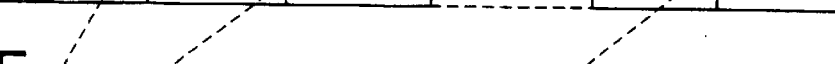
Figure 3E:
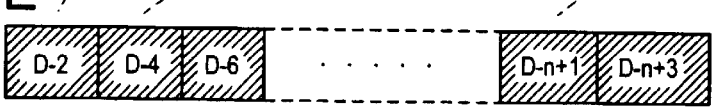

Here, FIG. 3D shows a group of sample data with the lower compression rate (D-1, D-3, D-5, . . . D-n, . . . ) stored in the storage area A while FIG. 3E shows a group of sample data with higher compression rate (D-2, D-4, D-6, . . . D-n+1) stored in the storage area B.

The storing and reading control unit 107 reads out sample data under the control of the control unit 105 based on an output mode designated through an operation button provided in the operation unit 109. For example, when the reading out is started in a mode for outputting highly compressed data, the storing and reading control unit 107 reads out sample data in the high compression rate group stored in the storage area B in turn and stores in the buffer memory 106 temporally.

The DSP 104, in accordance with an instruction from the control unit 105, reads out sample data from the buffer memory 106 in tern based on a sampling period (2/fs) of a sampling frequency fs/2 generated from a clock of an internal oscillator, not shown. Then, DSP 104 decompresses the sample data being read out at a decompression rate corresponding to a compression rate (high compression rate) applied to the data. The decompressed sample data is input to the D/A converter 110, converted to analog audio signals, and output from the audio output terminal 101b. Alternatively, the DSP 104 reads out sample data in the buffer memory 106 in turn, outputs it without decompression processing to the digital output unit 111, where it is converted into a predetermined transmission format and then output from the audio output terminal 101c. The data converted into the predetermined transmission format is sent at a higher transfer speed via a telephone line, for example. In this case, the sampling frequency of the sample data of the audio signals to be reproduced is fs/2.

An operation in the case where a reading out operation is started in the mode for outputting highly compressed data has been described above. Now, an operation in the case where a reading out operation is started in a mode for outputting low compressed data will be described.

That is, when the reading out is started in a mode for outputting low compressed data set through a mode setting button provided in the operation unit 109, the control unit 105 controls the storing and reading control unit 107 for reading out in turn the sample data in the low compression rate group stored in the storage area A and storing in the buffer memory 106 temporally.

The DSP 104, in accordance with an instruction from the control unit 105, reads out sample data from the buffer memory 106 in tern based on a sampling period (2/fs) of a sampling frequency fs/2 generated from a clock of an internal oscillator, not shown. Then, DSP 104 decompresses the read-out sample data at a decompression rate corresponding to a compression rate (10w compression rate)

applied to the data. The decompressed sample data is input to the D/A converter 110, converted to analog audio signals, and output from the audio output terminal 101b. In this case, the sampling frequency of the sample data of the audio signals to be reproduced back is fs/2.

In this embodiment, when the mode for outputting highly compressed data and the mode for outputting low compressed data are set concurrently for reproducing, it allows higher quality audio signals to be reproduced.

That is, when the reading out is started, by the mode-setting button provided in the operation unit 109, in a mode for outputting both highly compressed data and low compressed data, the control unit 105 controls the storing and reading control unit 107 for reading out the sample data from the storage area A and the storage area B alternately as, and then aligning and storing the sample data in the buffer memory 106, as shown in FIGS. 3D and 3E.

The DSP 104, in accordance with an instruction from the control unit 105, reads out sample data from the buffer memory 106 in turn based on a sampling period (1/fs) of a sampling frequency fs generated from a clock of an internal oscillator, not shown. Then, the DSP 104 decompresses the read-out sample data at a decompression rate corresponding a compression rate applied to the data (Accordingly, a decompression rate corresponding to the low compression rate and a decompression rate corresponding to the high compression rate are applied alternately). Then, as shown in FIG. 3B, the sample data is aligned in order of sample numbers and output to the D/A converter 110 or the digital output unit 111. In this case, the sampling frequency of the sample data of the audio signals to be reproduced is fs. Therefore, higher quality audio signals with a wider frequency band are reproduced.

As described above, according to this embodiment, in the case where sample data are stored on a storage medium at different bit rates, transmittable sample data can be output in shorter period of time even through a telephone line, which is a lower bit rate data transmission path, and higher quality audio signals can be reproduced.

It should be understood that while, in this embodiment, the control unit 105 controls the DSP 104 and the storing and reading control unit 107 for dividing sample data sequentially output by the A/D converter 103 into a group of sample data under odd numbers and a group of sample data under even numbers, compressing respective groups at different compression rates and storing the sample data in different storage areas A and B, the present invention is not limited thereto. It only needs that the control unit 105 controls the DSP 104 and the storing and reading control unit 107 for dividing the sample data sequentially output by the A/D converter 103 into a plurality of groups of sample data for every output period (interval), compressing every group at a different compression rate, and storing in a different storage area. In this case, the sampling frequency of audio signals reproduced by sample data in an arbitrary group is the reciprocal number of an output period (interval) used for grouping the arbitrary groups.

Next, a second embodiment of the present invention will be described.

In the first embodiment, two data with different bit rate are generated from audio signals, and they are stored in different storage areas A and B. On the other hand, in this embodiment, two data with different sampling frequencies are generated from audio signals, and they are stored in different storage areas A and B. A configuration of an IC memory storing and reading device according to this embodiment is the same as that in the first embodiment as shown in FIGS. 1A and 1B.

The control unit 105 of the first embodiment controls switchover of compression rate to be used by the DSP 104 to compress sample data and also controls storage of sample data compressed at different compression rate into different storage areas A and B. On the other hand, the control unit 105 according to this embodiment controls operations of the storing and reading control unit 107 such that sample data sequentially output from the DSP 104 is divided into two groups for every predetermined output period (interval) and those groups are stored in storage areas A and B, respectively. Here, operations by the storing and reading control unit 107 is controlled such that the sample data sequentially output from the DSP 104 at an interval 1/fs (where "fs" is a sampling frequency at the A/D converter 103) is stored in the storage area A while sample data sequentially output from the DSP 104 at an interval 4/fs is stored in the storage area B.

Next, an operation by the IC memory storing and reading device according to this embodiment will be described.

FIGS. 4A to 4D are diagrams for describing operational sequences for generating two data with different sampling frequencies from audio signals and storing them in different storage areas A and B in the IC memory storing and reading device according to this embodiment.

Figure 4A:
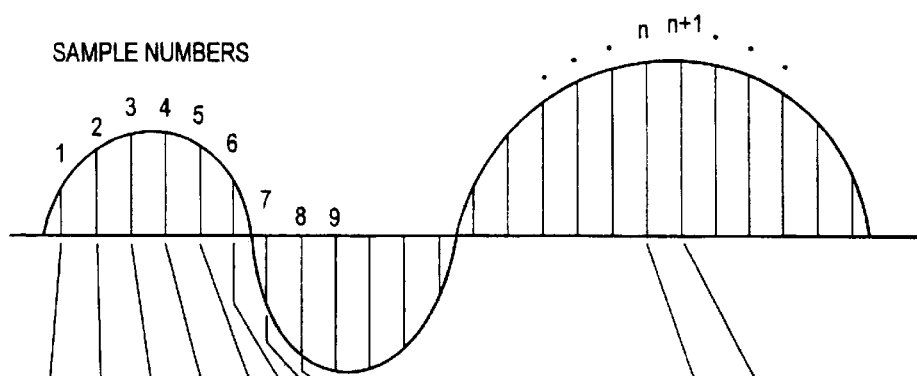
FIGS. 4A to 4D are diagrams for describing operational sequences in the case where audio signals are stored on an IC memory card as sample data sampled at different sampling frequencies in an IC memory storing and reading device of a second embodiment of the present invention.
Figure 4B:
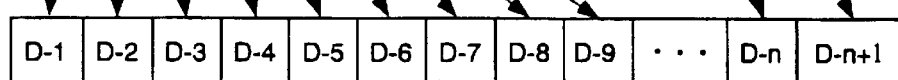

Here, FIG. 4A shows a state where analog audio signals to be input to the A/D converter 103 are sampled at a sampling frequency fs. Numerals 1, 2, 3, . . . n, n+1 are referred to sample numbers. Sample data under the sample number 1 is referred to D-1; sample data under the sample number 2 is referred to D-2; sample data under the sample number 3 is referred to D-3; and sample data under the sample number n is referred to D-n. FIG. 4B shows time-series order of sample data collected by sampling at the sampling frequency fs.

Figure 4C:
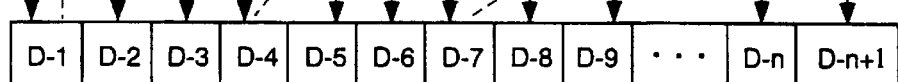
Figure 4D:

The buffer memory 106 temporally stores the sample data output sequentially at 1/fs period (where "fs" is a sampling frequency at the A/D converter 103) from the DSP 104. The storing and reading control unit 107 stores all the sample data stored in the buffer memory 106, that is, sample data sequentially output at 1/fs period from the A/D converter 103 in the storage area A in accordance with an instruction by the control unit 105. Sample data sequentially output at 4/fs period from the A/D converter 103 among the sample data stored in the buffer memory 106 is stored in the storage area B. As a result, the group of the sample data with the sampling frequency fs (D-1, D-2, D-3, . . . D-n, . . . ) is stored in the storage area A while the group of the sample data with the sampling frequency fs/4 (D-1, D-5, D-9, . . . D-(4n+1), . . . ) is stored in the storage area B. FIG. 4C shows an arrangement of the sample data stored in the storage area A while FIG. 4D shows an arrangement of sample data stored in the storage area B. In this way, only one sampling operation in the A/D converter 103 is needed for obtaining sampling data with a plurality of sampling frequencies are obtained by using a fraction of an integer of the sampling frequency fs in the A/D converter 103 as a sampling frequency of the group of the sample data to be stored in the IC memory card.

Next, an operation for reading out the sample data stored in a plurality of storage areas at different sampling frequencies will be described.

Figure 5A:
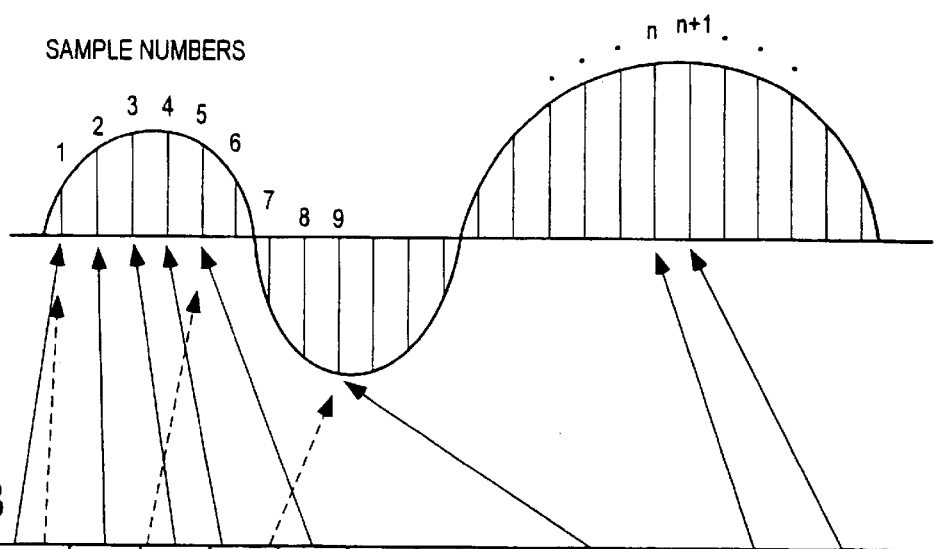
FIGS. 5A to 5C are diagrams for describing operational sequences in the case where audio signals are played back by reading out sample data stored at different sampling frequencies on an IC memory card in the IC memory storing and reading device of the second embodiment of the present invention.
Figure 5B:
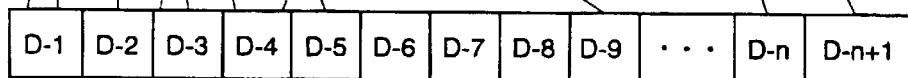
Figure 5C:
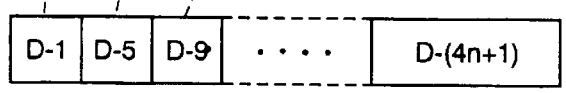

FIGS. 5A to 5C are diagrams for describing operational sequences for reading out the sample data stored in the storage areas A and B at different sampling frequencies for reproducing audio signals.

Here, FIG. 5B shows a group of the sample data at sampling frequency fs (D-1, D-2, D-3, ... D-n+1, ...) stored in the storage area A while FIG. 5C shows a group of the sample data at sampling frequency fs/4 (D1, D-5, D-9, ... D-(4n+1), ...) stored in the storage area B.

The storing and reading control unit 107 reads out sample data under the control of the control unit 105 based on a sampling mode designated through an operation button provided in the operation unit 109. For example, when the reads out is started in a mode for outputting sample data with the sampling frequency fs/4, the storing and reading control unit 107 reads out the sample data in the sampling frequency fs/4 group stored in the storage area B in turn and stores it in the buffer memory 106 temporally.

The DSP 104, in accordance with an instruction from the control unit 105, reads out sample data from the buffer memory 106 in turn based on a sampling period (4/fs) of a sampling frequency fs/4 generated from a clock of an internal oscillator, not shown. Then, DSP 104 decompresses the sample data being read out at a decompression rate corresponding to a compression rate applied to the data. The decompressed sample data is input to the D/A converter 110, converted to analog audio signals, and output from the audio output terminal 101b. Alternatively, the DSP 104 reads out the sample data in the buffer memory 106 in turn, outputs it without decompression processing to the digital output unit 111. Then, the sample data is converted into a predetermined transmission format and output from the audio output terminal 101c. The data converted into the predetermined transmission format is sent at a higher transfer speed via a telephone line, for example. In this case, the sampling frequency of the sample data of the audio signals to be reproduced is fs/4.

An operation in the case where a reading out operation is performed in the mode for outputting data at the sampling frequency fs/4 has been described above. Now, an operation in the case where a reading out operation is performed in a mode for outputting data at a sampling frequency fs will be described.

That is, when the reading out is started in a mode for outputting data at a sampling frequency fs set through a mode setting button provided in the operation unit 109, the control unit 105 controls the storing and reading control unit 107 for reading out the sample data in the sampling frequency fs group stored in the storage area A in turn and storing it in the buffer memory 106 temporally.

The DSP 104, in accordance with an instruction from the control unit 105, reads out the sample data from the buffer memory 106 in turn based on a sampling period fs of a sampling frequency fs generated from a clock of an internal oscillator, not shown. Then, the DSP 104 decompresses the read-out sample data at a decompression rate corresponding to a compression rate used for compressing the data. The decompressed sample data is input to the D/A converter 110, converted to analog audio signals, and output from the audio output terminal 101b. In this case, the sampling frequency of the sample data of the audio signals to be reproduced back is fs.

In this embodiment, when the mode for outputting sample data with the sampling frequency fs/4 and the mode for outputting sample data with the sampling frequency fs are set concurrently for reproducing, it allows high quality audio signals obtained from sample data with the sampling frequency fs to be audible for checking and further sample data with the sampling frequency fs/4 to be sent at a higher transfer speed via a telephone line, for example.

That is, when the reading out is started in a mode for outputting both data at the sampling frequency fs/4 and data at the sampling frequency fs through the mode setting button provided in the operation unit 109, the control unit 105 controls the storing and reading control unit 107 for reading out in turn the sample data from both the storage area A and the storage area B. The sample data at the sampling frequency fs read out in turn from the storage area A is decompressed in the DSP 104 and then output to the D/A converter 110. On the other hand, the sample data at the sampling frequency fs/4 read out in turn from the storage area B is decompressed in the DSP 104 and then output to the digital output unit 111.

In this case, higher quality audio signals with a wider frequency band is output from the D/A converter 110. The data output from the digital output unit 111 and output from the digital output terminal 101c to a telephone line, for example, has small number of bits suitable for the data transmission path at a low transfer speed.

As described above, according to this embodiment, in the case where sample data with different sample frequencies are generated from the same audio signals and stored on a storage medium, the sample data can be output which is transmittable in shorter period of time even through a telephone line, which is a lower bit rate data transmission path, and further higher quality audio signals can be reproduced. In other words, audio signals at a suitable sampling frequency can be selected and reproduced in accordance with an application.

It should be understood that while, in this embodiment, the control unit 105 controls the storing and reading control unit 107 dividing the sample data sequentially output by the A/D converter 103 into a group of sample data output at an interval 1/fs (that is, all the sample data output from the A/D converter 103) and a group of sample data output at an interval 4lfs and storing those groups in different storage areas A and B, respectively, the present invention is not limited thereto. It only needs that the control unit 105 controls the storing and reading control unit 107 for dividing the sample data sequentially output by the A/D converter 103 into a plurality of groups of sample data for every output period (interval) and storing those groups in a different storage area, respectively. In this case, the sample frequency of audio signals reproduced from sample data in an arbitrary group is a reciprocal number of an output period (interval) used for grouping the arbitrary group.

While preferred embodiments according to the present invention have been described, it should be understood that the present invention is not limited to each of those embodiments and various changes and modifications may be made without departing from the spirit and scope of the invention.

For example, in each embodiment above, while an IC memory storing and reading device using an IC memory card as a storage medium has been described for the illustrative purpose, the present invention may be applied widely to a data storage device using other storage media such as a hard disk. an optical disk and a magnetic disk.

Further, while in each embodiment above, sample data to be stored on a storage medium is obtained from audio signals, the present invention can be widely applied even when sample data is obtained from other analog signals such as video signals.

What is claimed is:

1. A data storage device for converting analog signals to digital data and storing the digital data on a storage medium, comprising:

sampling means for sampling said analog signals based on a sampling frequency;

compression means for compressing the sample data output sequentially from said sampling means;

storage means for storing the compressed data output sequentially from said compression means;

control means for controlling said compression means and said storage means so as to divide sample data output sequentially from said sampling means into a plurality of groups for every predetermined output period, compress each of those groups at different compression rates and store them in different storage areas, respectively;

reading-out means for sequentially reading out the compressed data stored in at least one of said storage areas;

decompression means for decompressing the compressed data sequentially read out by said reading-out means; and converting means for converting the data sequentially output by said decompression means to analog signals.

2. The data storage device according to claim 1, wherein said different storage areas are provided on the same storage medium.

3. The data storage device according to claim 1, wherein said different storage areas are provided on different storage media, respectively.

4. A data storage device for converting analog signals to digital data and storing the digital data on a storage medium, comprising:

sampling means for sampling said analog signals based on a sampling frequency;

storage means for storing the compressed data output sequentially from said compression means;

control means for controlling said storage means so as to divide the sample data output sequentially from said sampling means into a plurality of groups for every predetermined output period and store said plurality of groups of sample data in a first storage area and store a part of said plurality of groups of sample data in a second storage area, respectively;

reading-out means for sequentially reading out data stored in at least one of said storage areas; and converting means for converting data sequentially output by said decompression means to analog signals.

5. The data storage device according to claim 4, wherein said different storage areas are provided on the same storage medium.

6. The data storage device according to claim 4, wherein said different storage areas are provided on different storage media, respectively.

7. A device for converting an analog signal to digital data and storing the digital data, the device comprising:

an analog to digital converter that samples an analog signal at a first frequency and outputs digital data;

a processor that separates the digital data into groups that each have a first length and compresses the digital data on a group-by-group basis;

a controller that controls said processor so that the digital data in every nth group are compressed at a first compression rate that is different than rates at which the digital data in groups other than the nth group are compressed; and a first memory that stores the digital data from the nth groups and second memories that store the digital data from the groups other than the nth groups.

8. The device of claim 7, wherein said processor decompresses the compressed digital data from the groups, and further comprising a digital to analog converter that converts the decompressed digital data from said processor to an analog signal.

* * * * *